United States Patent [19]

Roth et al.

[11] Patent Number: 4,835,014

[45] Date of Patent: May 30, 1989

[54] METHOD FOR IMPARTING WATER REPELLENCY TO ABSORBENT INORGANIC BUILDING MATERIALS

[75] Inventors: Michael Roth, Burghausen; Herbert Glück, Emmerting, both of Fed. Rep. of Germany

[73] Assignee: Wacker-Chemie GmbH, Munich, Fed. Rep. of Germany

[21] Appl. No.: 107,691

[22] Filed: Oct. 13, 1987

[30] Foreign Application Priority Data

Oct. 16, 1986 [DE] Fed. Rep. of Germany ....... 3635260

[51] Int. Cl.$^4$ .......................... B05D 3/00; B05D 3/02
[52] U.S. Cl. ................................... 427/299; 427/136; 427/387; 427/393.6
[58] Field of Search ..................... 427/387, 393.6, 314, 427/299, 136

[56] References Cited

U.S. PATENT DOCUMENTS

| | | | |
|---|---|---|---|
| 3,819,400 | 6/1974 | Plankl et al. | 427/387 |
| 4,342,796 | 8/1982 | Brown et al. | 427/387 |
| 4,716,051 | 12/1987 | Rodder | 427/136 |

*Primary Examiner*—Sadie Childs

[57] ABSTRACT

A method for imparting water repellency to absorbent inorganic building materials by first contacting at least a part of the surface of the building materials to be rendered water repellent, with at least partially liquid water and thereafter applying a solution containing an organosilicon compound and a water-immiscible organic solvent to the moist surface of the inorganic building materials.

3 Claims, No Drawings

METHOD FOR IMPARTING WATER REPELLENCY TO ABSORBENT INORGANIC BUILDING MATERIALS

The present invention relates to water repellent inorganic building materials and more particularly to a method for treating absorbent inorganic building materials to impart water repellency thereto.

BACKGROUND OF THE INVENTION

Heretofore, water repellent properties have been imparted to inorganic building materials by applying solutions containing organosilicone compounds and an organic solvent, such as a hydrocarbon solvent, to at least part of the surface of the building materials which are to be rendered water repellent. U.S. pat. No. 4,342,796 to Brown et al, for example, describes a method for treating reinforced concrete by applying a hydrolyzable organosilicon compound to the surface of the reinforced concrete and thereafter contacting the organosilicon coated surface with an effective amount of water to substantially wet the surface of the organosilicon impregnated structure.

U.S. Pat. No. 3,819,400 to Plankl et al describes a method for treating porous substrates to render them water repellent by hydromechanically treating the porous substrates and thereafter applying a solution of one or more organosilicon compounds in a $C_2$ to $C_4$ alkanol to render the porous substrates hydrophobic.

In the methods described above, the substrates were substantially dry or when the substrates are moist, they were treated with organosilicon compounds dissolved in short chain alkanols as the organic solvent.

The brochure "Wacker silicone, Silicone Masonry Water Repellents" SME-8-142.8011 recommends that an organosiloxane in an organic solvent be diluted with aromatic or aliphatic hydrocarbons, i.e., with a water-immiscible solvent. The pamphlet also sttes that the effect on slightly wet areas is also good; however, the brochure does not indicate that better results are obtained with a wet surface over those obtained with a dry surface.

Therefore, it is an object of the present invention to provide a method for imparting water repellency to absorbent inorganic building materials. Another object of the present invention is to provide a method for imparting water repellency to inorganic building materials by treating the building materials with solutions containing organosilicone compounds and water-immiscible organic solvents. Another object of the present invention is to provide a method for imparting water repellency to inorganic building materials which requires only a small quantity of an organosilicone compound. Still another object of the present invention is to provide a method for imparting water repellency to inorganic building materials in which the organosilicone compound deeply penetrates into the treated building material. A further object of the present invention is to provide a method for imparting water repellency to inorganic building materials, in which water is absorbed very slowly into the treated building materials.

SUMMARY OF THE INVENTION

The foregoing objects and others which will become apparent from the following description are accomplished in accordance with this invention, generally speaking, by providing a method for imparting water repellency to absorbent inorganic building materials which comprises contacting at least a part of the surface to be rendered water repellent with at least partially liquid water and thereafter applying to the moist surface a solution containing organosilicone compounds which impart water repellency to building materials and a water-immiscible organic solvent.

DETAILED DESCRIPTION OF THE INVENTION

The absorbent inorganic building materials which are rendered hydrophobic by the method of this invention may be the same absorbent inorganic building materials which have been or could have been rendered water repellent by the methods known heretofore for treating absorbent inorganic building materials by applying organosilicone compounds in a water-immiscible solvent to a part of the surface of the building materials which are to be rendered water repellent. Such inorganic building materials are, for example, sandstone, sand-based wall coatings and hydraulically and/or nonhydraulically bonded inorganic substances such s lime, cement and/or gypsum, walls and other surfaces made of concrete, asbestos cement, brick, slag bricks or natural stone, such as marble, lime or sandstone slabs as well as colored sandstone.

Objects prepared from concrete, including concrete roads, which may contain reinforcing elements may also be treated by the method of this invention.

Likewise, the method of this invention is also applicable to treating mortar surfaces made from sand and cement, in which the mortr may be used to fill gaps between bricks and/or natural and/or synthetic rock.

The organosilicone compounds used to impart hydrophobic properties to inorganic building materials in the method of this invention are the same organosilicone compounds which have been or could have been used heretofore to impart hydrophobic properties to absorbent inorganic building materials by applying to at least a part of the surface of such building materials, a solution containing organosilicone compounds and a water-immiscible solvent. Examples of suitable organosilicone compounds are organosilanes of the formula:

where R represent the same or different monovalent hydrocarbon radicals which are free of aliphatic multiple bonds and which contain from 1 to 18 carbon atoms per radical; $R^1$ represents the same or different monovalent alkyl radicals which may be substituted with an ether-oxygen and which comprises from 1 to 5 carbon atoms per radical; n is 0, 1, 2 or 3, preferably an average of from 0.9 to 1.8; and partial hydrolysates of these silanes, in which the hydrolysates contain up to 10 Si atoms per molecule; organosilanes of the formula:

where $R^1$ is the same as above and $R^2$ represents a divalent alkyl radical having from 1 to 18 carbon atoms per radical and partial hydrolysates of these silanes which contain up to 20 Si atoms per molecule; reaction products of silanes of the formulas:

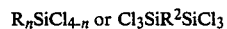

where R, R² and n are the same as above, and ethylene glycol and/or diethylene glycol; as well as organopolysiloxanes containing more than 10 Si atoms per molecule and which contain units of the formula:

$$R_xSi(OR^1)_y(OH)_zO_{(4-x-y-z)/2}$$

and optionally units of the formula:

$$SiR^2Si(OR^1)_y(OH)_zO_{(4-y-z)/2}$$

where R, R¹ and R² are the same as above; x, y and z represent 0, 1, 2 or 3, and the sum of $x+y+z$ is no more than 3, in which the average value of x is between 0.9 and 1.8, preferably between 0.9 and 1.3; and the average value of y and z is between 0.00 and 0.20, with the proviso that at least one of the values of y and z should be at least 0.01.

Examples of hydrocarbon radicals represented by R are alkyl radicals such as methyl, ethyl, n-propyl, isopropyl and sec-butyl radicals, as well as pentyl, octyl and octadecyl radicals; aryl radicals, such as the phenyl radical; alkaryl radicals, such as the tolyl radicals; and aralkyl radicals, such as the benzyl radical. Because of their availability, it is preferred that in the organopolysiloxanes containing up to 10 Si atoms per molecule, at least 50 percent of the number of SiC-bonded monovalent hydrocarbon radicals and thus the R radicals are methyl radicals.

The examples of alkyl radicals represented by R containing from 1 to 5 carbon atoms also are representative of the R¹ alkyl radicals. An example of an alkyl radical represented by R¹ which has been substituted by an ether-oxygen is the methoxyethylene radical.

An example of a preferred divalent alkyl radical represented by R² is the ethylene radical.

In the method of this invention, only one organosilicone compound that is known to impart water repellency to building materials need be used; however, a mixture of two or more different types of such organosilicone compounds may also be used.

The water-immiscible organic solvents used in the method of this invention may be the same water-immiscible organic solvents which have been, or could have been used heretofore, for imparting water repellency to absorbent inorganic building materials by treating at least a part of the surface of the building materials with solutions of hydrophobic-imparting organosilicone compounds in a water-immiscible organic solvent to impart water repellent properties thereto.

In the method of this invention; the preferred water-immiscible organic solvents are aliphatic and aromatic hydrocarbons. Examples of such water-immiscible organic solvents are cyclic, linear or branched alkanes having boiling points between 120° and 200° C. at 1,020 hPa (absolute), aromatic hydrocarbons such as toluene, xylol isomeric mixtures, trimethylbenzenes, tetramethylbenzenes, tetrahydronaphthalene and decahydronaphthalene, as well as mixtures comprising two or more of such hydrocarbons, such as a commercially available mixture consisting of 83 percent by weight of alkanes and 17 percent by weight of aromatics. This mixture has a boiling point in the range of from 145° to 190° C. at 1,020 hPa (absolute) and is available under the name "Kristallöl 30". Additional examples of water-immiscible organic solvents are chlorinated hydrocarbons, such as trichloroethylene, and esters such as ethylacetate and ethers, such as di-n-butylether.

Water-miscible solvents such as alkanols or diacetone alcohol, are preferably used in the method of this invention in an amount of from 0 to 5 percent by weight, based on the total weight of the organic solvents.

It is preferred that the solutions of organosilicone compounds which impart water repellency to building materials contain from 0.2 to 95 percent by weight and more preferably between 2 and 50 percent by weight of the organosilicone compound, based on the total weight of the solvent and the organosilicone compound which imparts water repellent properties to inorganic building materials.

In addition to solvents and the organosilicone compounds which impart water repellency to building materials, the solutions used in the method of this invention may also contain other substances. Examples of such other substances are fillers having a surface area of at least 50 m²/gm (determined by nitrogen absorption in accordance with ASTM Special Technical Publication No. 51, 1941, page 95 ff, i.e., the so-called "BET method"), such as pyrogenically produced silicone dioxide on whose surface organosilyl groups may be present, and materials which impart hydrophobic properties to building materials other than the organosilicone compounds, such as polyacrylic acid ester and polymethacrylic acid ester; copolymers of vinyl chloride that are soluble in water-immiscible solvents; epoxy resins; aliphatically unsaturated polyester resins; highly chlorinated polyolefins and chlorinated rubber; as well as saturated aliphatic hydrocarbons having a boiling point of at least 360° C. at 1,020 hPa (absolute). Additional examples of substances which may be present in these solutions are condensation catalysts, such as dibutyltin dilaurate and titanium alcoholates.

The organosilicone compound solutions used to impart water repellency to building materials may be applied to the surfaces which are to be treated by any method known in the art for applying solutions or dispersions to surfaces, such as, for example by spraying, pouring, coating, rolling, brushing or immersion.

The surface of the building material which is to be rendered water repellent is contacted with at least partially fluid water having a temperature of from 0° to above 150° C. before the water-immiscible solution of organosilicone compound is applied to the surface of the building material. The water contact may be brought about by any thermohydraulic or hydromechanical method, such as a steam jet treatment, with the steam condensing on the treated surface, or by spraying, pouring, coating, rolling, brushing or by immersion.

It is preferred that the period over which at least part of the surface of the building material which is to be made water repellent, is contacted with at least partially fluid water before the organosilicone compound solution is applied, be of a duration of from 1 to 35 minutes and preferably from 1 to 15 minutes, and more preferably, from 2 to 6 minutes.

In order to provide for uniform penetration of the water into the building material before the organosilicone compound is applied, it is preferred that at least the surface which has been treated with the water, be covered, for example, from 1 to 30 days with a plastic sheet in order to prevent the premature evaporation of the water.

In the following examples, all parts and percentages are by weight unless otherwise specified.

The organosilicone compounds used to impart water repellency to building materials in the following examples were prepared in the following manner:

Impregnating Agent (A)

(a) A mixture consisting of 92 parts of methyltrichlorosilane and 52 parts of 2-ethylhexyltrichlorosilane is introduced at the upper end of a reaction column. Thereafter, a mixture containing 47 parts of methanol and 5 parts of water is introduced in the middle of the column, against the silane mixture. Hydrogen chloride is removed from the upper end of the column and a mixture of organosilicone compounds having a viscosity of 3.5 to 3.8 $mm^2.s^{-1}$ at 23° C., is removed from the bottom end of the column.

(b) About 100 parts of the mixture of organosilicone compounds prepared in (a) above are mixed with 1 part of di-n-butyltin dilaurate. About 80 parts of the resultant mixture are mixed with 20 parts of a suspension containing 2 parts of pyrogenically produced silicon dioxide which has been treated with hexamethyldisilazane to render the silicon dioxide hydrophobic and which has a BET surface area of $140\pm30$ $m^2/g$, 9 parts of aromatics having an average density $d_4^{20}$ of 0.873 and a boiling range between 160° and 178.5° C. at 1,020 hPa (absolute), i.e., solvent naphtha, and 9 parts of diacetone alcohol.

(c) About 1 part of the above mixture prepared in (b) above is mixed with 11 parts by weight of a commercially available mixture consisting of 83 percent alkanes and 17 percent aromatics and having a boiling range between 145° C. and 190° C. at 1,020 hPa (absolute).

Impregnating Agent (B)

About 99 parts of the mixture of organosilicone compounds prepared in (a) above are mixed first with 1 part of di-n-butyltin dilaurate and then with 100 parts of 2-ethylhexyltrimethoxysilane. About 1 part of he resultant mixture is then dissolved in 4 parts of a commercially available mixture consisting of 83 percent alkanes and 17 percent aromatics, and having a boiling range between 145° C. and 190° C. at 1,020 hPa (absolute).

Example 1

Seven sandstone bricks were cut in half and immersed in tap water for the period of time shown in Table 1, then wrapped in plastic foil and stored in the foil wrapping for 7 days. The sandstone bricks were then removed from the foil wrapping, immersed for 1 minute into impregnating agent (A), then reimmersed for an additional 1 minute in impregnating agent (A), and finally stored for 14 days in atmospheric air. The depth to which the organosilicone compound has penetrated the sandstone bricks and the amount of water absorbed by the impregnated bricks are then determined.

The amount of water absorbed is determined by first weighing the dried bricks and then they are placed in water having a temperature of 20° C. The surface of the water is kept at 5 cm above the top of the bricks. After various periods of time, which are shown in Table 2, the bricks are removed from the water and after the excess water has run off, the bricks are again weighed. The value referred to as the "S-value" represents the sum of the water absorption values in $kg/m^2$ in each row of the table. The lower the S-value, the lower the absorption of the water. The values shown in the two tables are mean values.

TABLE 1

| No. | Duration of $H_2O$ treatment minutes | Impregnation agent Absorption $g/m^2$ after | | Penetration in mm |
|---|---|---|---|---|
| | | 1 minute | 2 minutes | |
| 1 | 1 | 605 | 976 | 5.9 |
| 2 | 3 | 542 | 890 | 6.7 |
| 3 | 5 | 471 | 762 | 4.2 |
| 4 | 10 | 455 | 709 | 3.9 |
| V (+) | 0 | 639 | 1086 | 4.5 |

(+) = Comparison Example

TABLE 2

| No. | Duration of $H_2O$ treatment Minutes | Water absorption in $kg/m^2$ after the following number of hours | | | | | | | |
|---|---|---|---|---|---|---|---|---|---|
| | | 0.5 | 1 | 2 | 3 | 5 | 7 | 24 | S-value |
| 1 | 1 | 0.04 | 0.07 | 0.09 | —(++) | 0.09 | 0.13 | 0.20 | 0.709 |
| 2 | 3 | 0.02 | 0.04 | 0.06 | —(++) | 0.06 | 0.07 | 0.13 | 0.419 |
| 3 | 5 | 0.02 | 0.04 | 0.06 | 0.06 | 0.07 | 0.09 | 0.15 | 0.473 |
| 4 | 10 | 0.04 | 0.04 | 0.06 | 0.06 | 0.07 | 0.09 | 0.18 | 0.528 |
| V (+) | 0 | 0.04 | 0.06 | 0.07 | 0.09 | 0.13 | 0.15 | 0.29 | 0.818 |

(+) = Comparison Example
(++) = not determined

Example 2

The method described in Example 1 was repeated, except that impregnating agent (B) was substituted for impregnating agent (A). The rsults are shown in Table 3.

TABLE 3

| No. | Duration of $H_2O$ treatment minutes | Impregnation agent absorption in $g/m^2$ after | | Penetration in mm |
|---|---|---|---|---|
| | | 1 minute | 2 minutes | |
| 1 | 1 | 652 | 1042 | 10.5 |
| 2 | 3 | 521 | 861 | 8.9 |
| 3 | 5 | 497 | 780 | 9.4 |
| 4 | 10 | 489 | 749 | 10.4 |
| 5 | 30 | 277 | 397 | 9.4 |
| V (+) | 0 | 631 | 1037 | 7.1 |

(+) = Comparison Example

What is claimed is:

1. A method for imparting water repellency to an absorbent inorganic building material which comprises contacting at least a portion of the surface of the building material which is to be rendered wateer repellent with at least partially fluid water having a temperature of from 0° to above 150° C. and thereafter applying a solution containing an organosilicone compound which imparts water repellency to an inorganic building material and a water-immiscible solvent to the wet surface.

2. The method of claim 1, wherein the water treatment is from 2 to 6 minutes.

3. The method of claims 1 or 2, wherein the surface has been treated with water and is covered for from 1 to 30 days before the organosilicone compound solution is applied to the building material.

* * * * *